US012595191B2

(12) United States Patent (10) Patent No.: US 12,595,191 B2

King (45) Date of Patent: Apr. 7, 2026

(54) WASTEWATER UNIT WITH INTERNAL SANDWICHED CONNECTOR

(71) Applicant: Eljen Corporation, Windsor, CT (US)

(72) Inventor: James M. King, Ellington, CT (US)

(73) Assignee: Eljen Corporation, Windsor, CT (US)

( * ) Notice: Subject to any disclaimer, the term of this patent is extended or adjusted under 35 U.S.C. 154(b) by 327 days.

(21) Appl. No.: 18/471,396

(22) Filed: Sep. 21, 2023

(65) Prior Publication Data

US 2024/0101445 A1 Mar. 28, 2024

Related U.S. Application Data

(60) Provisional application No. 63/409,391, filed on Sep. 23, 2022.

(51) Int. Cl.
*C02F 1/00* (2023.01)
*E02B 11/00* (2006.01)
(Continued)

(52) U.S. Cl.
CPC ............ *C02F 1/004* (2013.01); *E02B 11/005* (2013.01); *E03F 1/002* (2013.01); *F16L 5/00* (2013.01);
(Continued)

(58) Field of Classification Search
CPC ................ C02F 1/004; C02F 2201/007; C02F 2201/004; C02F 2103/001; C02F 2103/06; C02F 2103/10; C02F 2103/005; E02B 11/005; E03F 1/002; F16L 5/00; B01D 29/03
See application file for complete search history.

(56) References Cited

U.S. PATENT DOCUMENTS

| 2,052,020 A | 8/1936 | Black |
| 4,094,466 A * | 6/1978 | DeRomano ............ A01G 25/06 |
| | | 405/36 |

(Continued)

FOREIGN PATENT DOCUMENTS

| RU | 1772313 A1 | 10/1992 |
| WO | 2018168398 A1 | 9/2018 |

OTHER PUBLICATIONS

"Eljen® In-Drain, A Cost-Effective Replacement For Septic Leach Field Materials," Eljen Corporation, prior to Jan. 2, 2019.
(Continued)

*Primary Examiner* — Liam Royce
(74) *Attorney, Agent, or Firm* — Alix, Yale & Ristas, LLP

(57) ABSTRACT

A connector for maintaining a module in a fluid treatment unit has a web extending axially relative to an axially extending pipe and a fin extending laterally. The unit is configured to attach to the pipe via the web with the fin extending laterally. Core sheets or other support material is positioned on the pipe on each side of the fin with the pipe extending therethrough to define a support unit of the module. Fabric is wrapped around at least a front face and rear face, optionally all faces and secured in place. The fabric wrapping acts to attach the module with the front and rear support unit portions sandwiching the fin, which maintains the module in its position on the pipe. The connector improves assembly efficiency and fluid flow rate out from the center of the module, which thereby improves treatment of wastewater.

20 Claims, 11 Drawing Sheets

(51) Int. Cl.

| | |
|---|---|
| *E03F 1/00* | (2006.01) |
| *F16L 5/00* | (2006.01) |
| *C02F 103/00* | (2006.01) |

(52) U.S. Cl.

CPC .. *C02F 2103/005* (2013.01); *C02F 2201/007* (2013.01)

(56) References Cited

U.S. PATENT DOCUMENTS

| | | | | |
|---|---|---|---|---|
| 4,824,287 A | | 4/1989 | Tracy | |
| 4,898,494 A | | 2/1990 | Ellis | |
| 5,597,264 A | | 1/1997 | Laak | |
| 5,829,916 A | * | 11/1998 | Evans | E02B 11/005 405/51 |
| 5,951,203 A | | 9/1999 | Laak | |
| 6,712,554 B1 | * | 3/2004 | Froehly | E02B 11/005 405/36 |
| 7,374,670 B2 | | 5/2008 | Potts | |
| 8,104,994 B1 | | 1/2012 | Donlin | |
| 2010/0101045 A1 | | 4/2010 | Van Walraven et al. | |
| 2020/0062197 A1 | | 2/2020 | Nakaizumi | |

OTHER PUBLICATIONS

"In-Drains," Ruck Systems, Inc., Storrs, Connecticut, 1992.

Laak, R., "Ruck A Fins—R1032C. Manual Design and Installation," Ruck Systems, 2009.

Laak, R., "Ruck L, Fins," Ruck Systems, Inc., Mar. 31, 1997.

Laak, R., "Using In-Drain Geosynthetics in Soil Infiltration Systems," Univ. of Connecticut, 1989 International Summer Meeting of the American Society of Agricultural Engineers and the Canadian Society of Agricultural Engineering, Jun. 25-28, 1989.

Laak, R., "Using In-Drains at Soil Clogging Infiltration Surface," Univ. of Connecticut, 1988 International Summer Meeting of the American Society of Agricultural Engineers, Jun. 26-29, 1988.

Mantis® product, early version with spacer comb photo, Eljen Corporation, prior to Jan. 2, 2019.

"Mantis® Wastewater Systems 536-8 Series, System Design & Installation Manual," Eljen Corporation, Connecticut, Feb. 2015.

* cited by examiner

WASTEWATER UNIT WITH INTERNAL SANDWICHED CONNECTOR

BACKGROUND

The present disclosure relates generally to the field of subsoil fluid drainage, absorption and treatment systems, and more particularly to a connector for securing a module to a support pipe.

The disclosed connector is advantageously fully internal to a module with a fin of the connector sandwiched between adjacent sheets of supportive core material in a unit with multiple modules spaced along a pipe. The core material of each module is wrapped in a fluid permeable filter fabric, and as such, each of the modules may be maintained in position along the pipe and rotationally fixed by the sandwiched fin.

Conventional subsoil fluid absorption systems are comprised of trenches or excavations filled with small rock aggregate and overlaid with a perforated pipe. The pipe may be overlaid with a geotextile fabric and/or more rock aggregate. Soil is placed over the aggregate and perforated pipe to fill the trench to the adjoining ground level. In use, fluid flows through the pipe and out the perforations. Fluid is held within cavities in the aggregate until it can be absorbed into the soil. Other conventional systems use hollow plastic chambers placed beneath ground level to hold fluid until the fluid can flow through slits or apertures in the chamber and can be absorbed into the soil.

In a particularly effective wastewater treatment system manufactured and sold by Eljen Corporation under the name Mantis®, individual modules are spaced apart from one another along a support pipe that passes through the center of each module. Each of the modules includes a support structure with at least one layer of a treatment fabric wrapped around the support structure. In the Mantis® wastewater system, the support pipe doubles as a wastewater delivery conduit with holes that are aligned with the modules to deliver wastewater to the interior of the modules. An ongoing consideration with such units is maintaining the individual modules in their respective position along the pipe without shifting, sliding or rotating along the pipe. Alignment units or connectors have been developed that mechanically connect modules to the pipe and/or to adjacent modules. These units are positioned on the exterior of the modules, typically in contact with a portion of the overlaid fabric. An additional highly effective connecting unit utilized by Eljen Corporation and embodied in U.S. Pat. No. 11,254,587 (the '587 patent) includes a central web and a cooperative pair of outer flanges. In the wastewater product described in the '587 patent, the connector is secured to the pipe with the spaced apart fins sandwiching a series of face-to-face core sheets, and a layer of filter fabric is wrapped around the outside, including the flanges.

A set of multiple spaced apart modules along a fluid distribution pipe is placed within an excavated section of a property, typically in a substantially flat alignment, and then the excavation is backfilled with soil or sand. In such treatment systems, a key consideration is the surface contact between the outer fabric of the modules and the surrounding soil. Over time, organic deposits develop on the surface of the fabric (the interface between the fabric and surrounding soil), commonly referred to as a biomat layer. The biomat layer is a significant contributor for naturally treating bio-related fluid, such as septic fluid or drainage, in the soil. Thus, it is highly advantageous to maximize the fabric-soil interface contact area and minimize encroachment and disruption of the surrounding soil environment.

Connectors for these and similar systems exist that hold the modules or structural portions of modules in place via force from a pair of spaced outer flanges holding the structural components inward. While highly effective at holding modules in place, the outer flanges can impart inefficiencies during the manufacturing process because assemblers must fit the edges of a hole in the structural material over one of the outer flanges. Additionally, the relatively moderate height of the flanges in any existing external connectors or support flanges can leave the outer sections of modules less rigid.

It would be useful to have a connector for mechanically holding each module in place along the length of the pipe that operates internal to the core sheets themselves and mechanically takes advantage of the sandwiched configuration thereof. It would be additionally advantageous to have a connector that maintains each module in a fixed rotational position about the pipe.

Concepts relevant to the Mantis® wastewater system and other related spaced modular fluid treatment systems are disclosed and claimed in Eljen Corporation's U.S. Pat. Nos. 8,104,994, 8,777,515, 9,809,941, and 11,254,587, which are incorporated herein by reference for background of the types of systems and modules within which the inventive connectors are configured to be used.

SUMMARY

In one embodiment, a fluid treatment unit includes an elongate support pipe, one or more fluid treatment modules and a connector. The one or more modules are positioned on the pipe with the pipe extending longitudinally through a front and rear face. The connector is attached to the support pipe and has a fin extending substantially perpendicular to the longitudinal axis defined by the pipe and holds one of the one or more fluid treatment modules in its longitudinal position on the pipe. The one or more fluid treatment modules comprises a front support portion on a first longitudinal side of the fin and a rear support portion on a second longitudinal side of the fin. A layer of filtration media is wrapped around the front support portion and rear support portion of the one or more fluid treatment modules, which fixes the module in place with the fin sandwiched between the front support portion and rear support portion.

In another embodiment, a fluid treatment unit has an elongate support pipe, a plurality of fluid treatment modules and a plurality of connectors. The modules are positioned on the pipe with the pipe extending longitudinally through their front and rear face and longitudinal spacing between adjacent modules. Each of the modules has a support unit with at least the front face and rear face wrapped in fabric. Each of the connectors has a fin extending substantially perpendicular to the longitudinal axis defined by the pipe and into an interior of the support unit of one of the modules to maintain the module in its longitudinal position on the pipe.

In yet another embodiment, a connection within a fluid treatment unit includes a connector, one or more front units of support that is not fluid absorbent, one or more rear units of support that is not fluid absorbent, and one or more layers of fabric that is fluid permeable. The connector comprises a substantially flat fin defining a front side and rear side. The one or more front units abuts the front side of the fin and the one or more rear units abuts the rear side of the fin. The one or more layers of fabric is wrapped around the front units and rear units. In this manner, the fabric holds the front units and rear units relative to each other and the connector with the fin maintained between them via force from the wrapping. The connector is rigidly attachable to a fluid distribution conduit to yield a rigid engagement of the front units, rear units and fabric relative to the fluid distribution conduit.

BRIEF DESCRIPTION OF THE DRAWINGS

Aspects of the preferred embodiments will be described in reference to the Drawings, where like numerals reflect like elements.

DETAILED DESCRIPTION

Among the benefits and improvements disclosed herein, other objects and advantages of the disclosed embodiments will become apparent from the following wherein like numerals represent like parts throughout the several figures. Detailed embodiments of a sandwiched connector for a modular fluid treatment system are disclosed; however, it is to be understood that the disclosed embodiments are merely illustrative of the invention that may be embodied in various forms. In addition, each of the examples given in connection with the various embodiments of the invention which are intended to be illustrative, and not restrictive.

Throughout the specification and claims, the following terms take the meanings explicitly associated herein, unless the context clearly dictates otherwise. The phrase "in some embodiments" as used herein does not necessarily refer to the same embodiment(s), though it may. The phrases "in another embodiment" and "in some other embodiments" as used herein do not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on.

Further, the terms "substantial," "substantially," "similar," "similarly," "analogous," "analogously," "approximate," "approximately," and any combination thereof mean that differences between compared features or characteristics is less than 25% of the respective values/magnitudes in which the compared features or characteristics are measured and/or defined.

Figure 1:
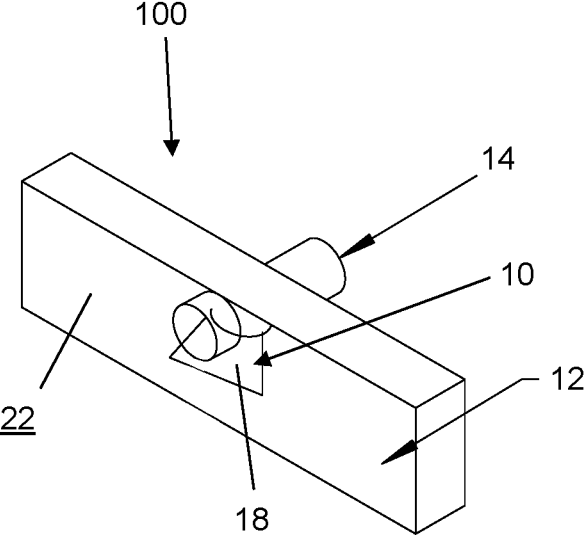
FIG. 1 shows a view of a representative module on a pipe maintained via the disclosed sandwiched connector.
Figure 2A:
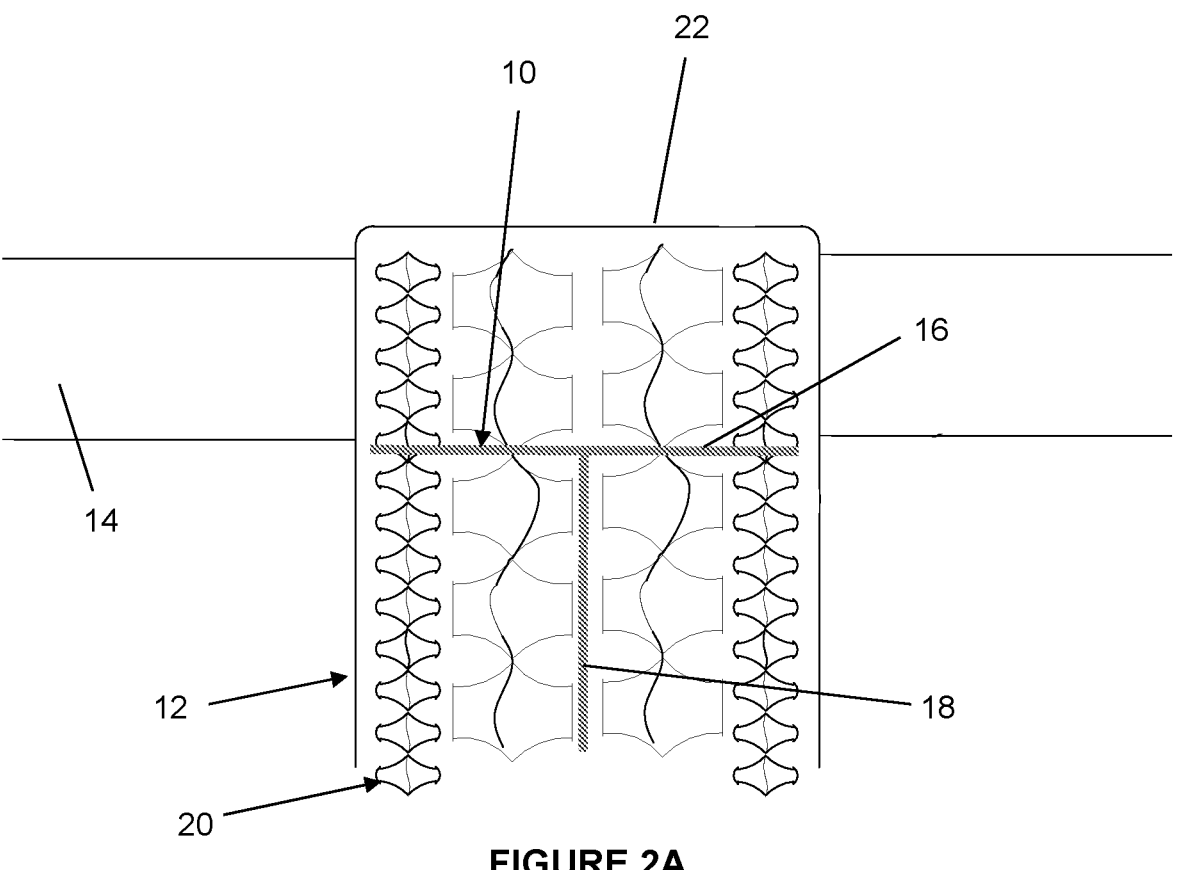
FIG. 2A shows a side cross sectional view of the module attached to a pipe via the sandwiched connector.
Figure 2B:
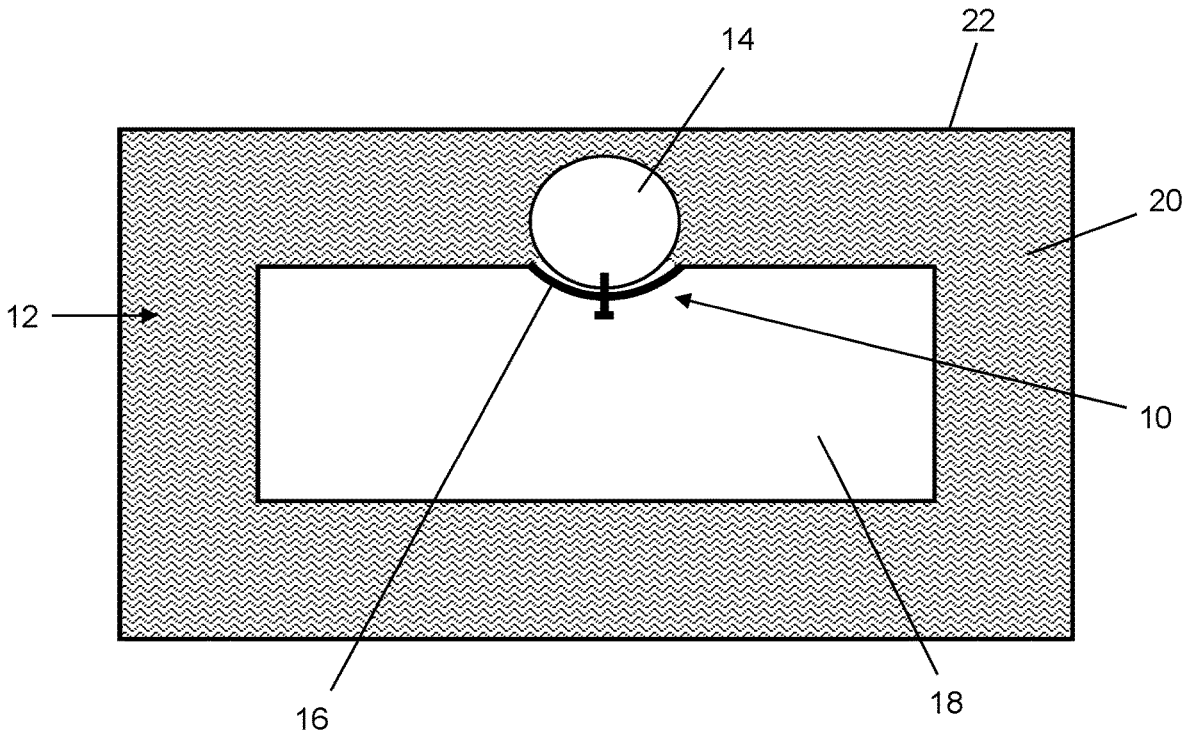
FIG. 2B shows a front cross sectional view of the module of FIG. 2A.
Figure 2C:
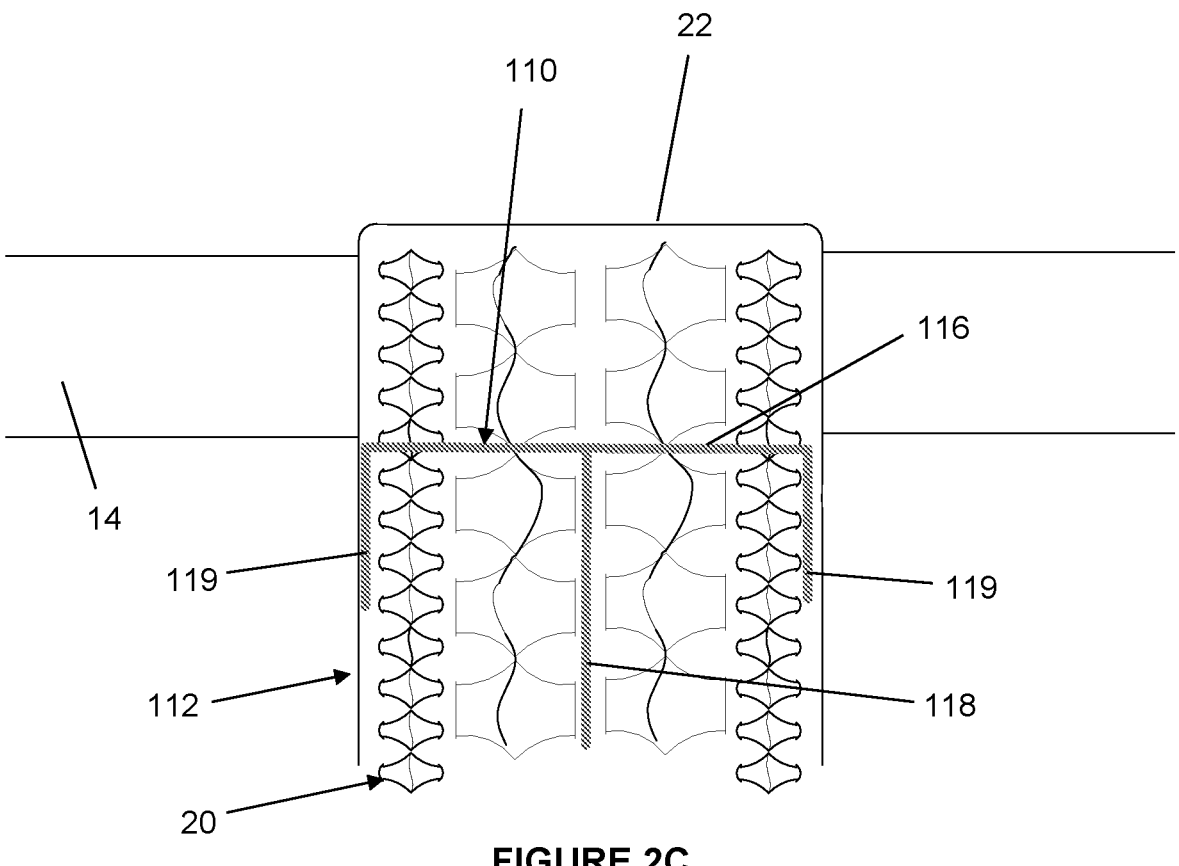
FIG. 2C shows a side cross sectional view of a module attached to a pipe via another embodiment of the sandwiched connector.
Figure 3:
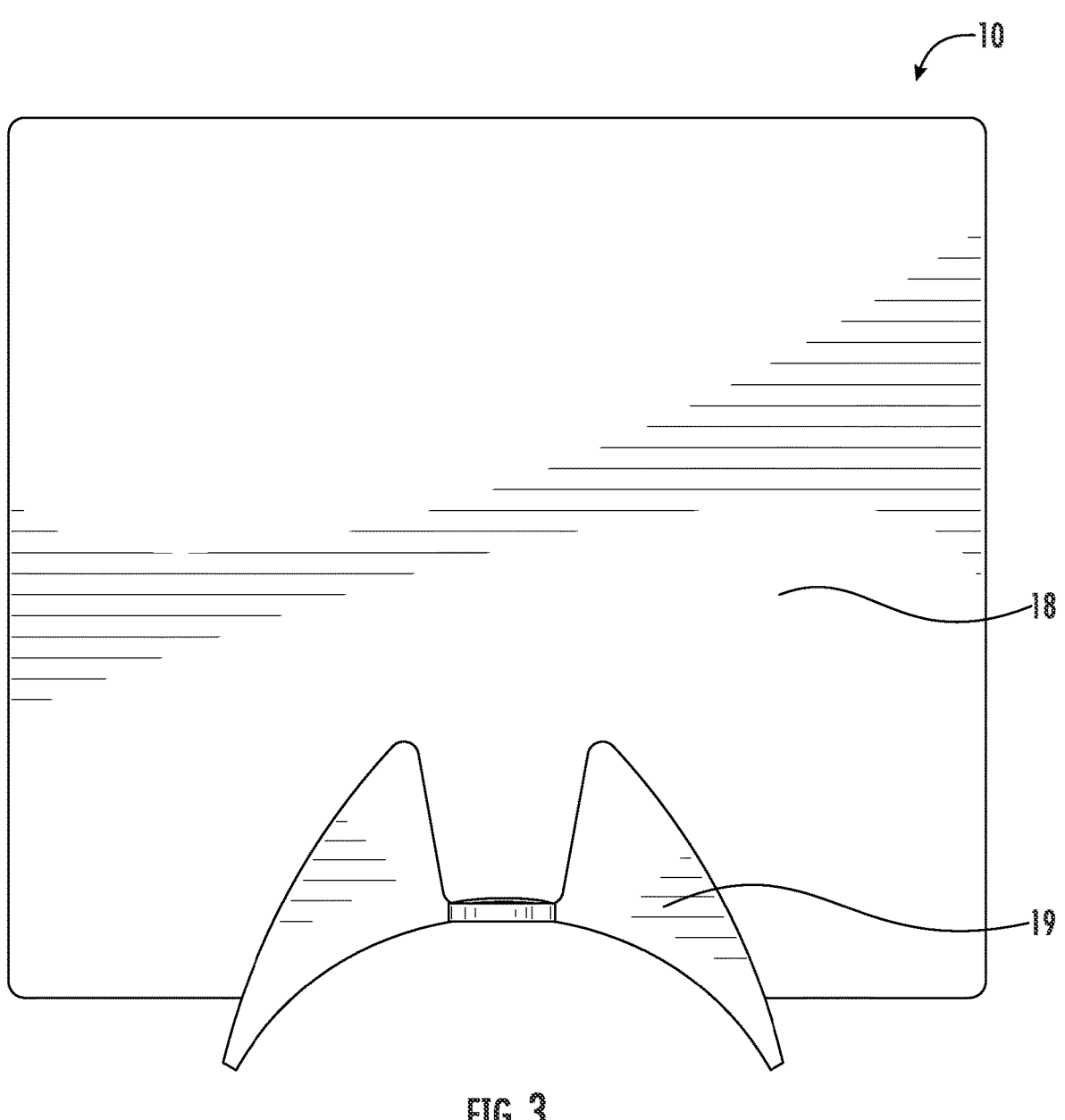
FIG. 3 is an end elevation of an embodiment of the sandwiched connector.
Figure 4:
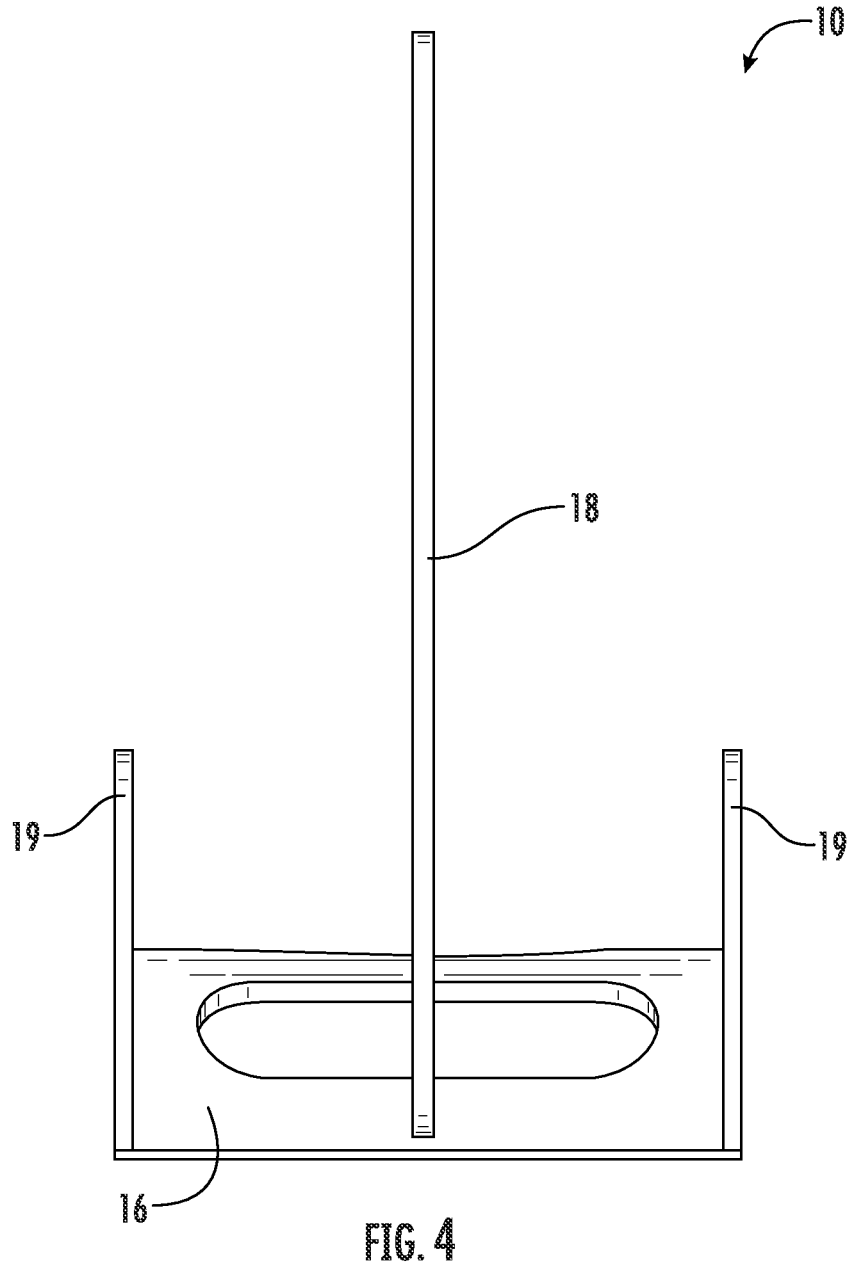
FIG. 4 is a side elevation of the sandwiched connector of FIG. 3.
Figure 5:
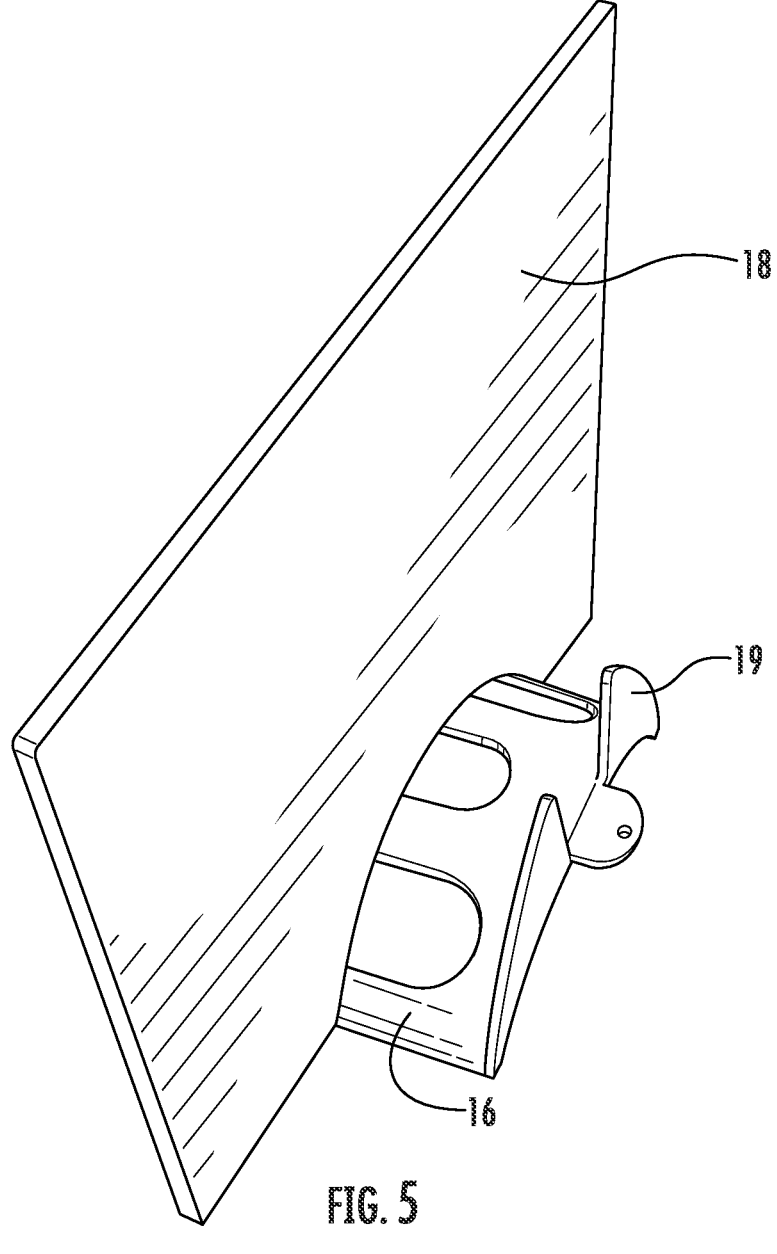
FIG. 5 is a bottom perspective of the sandwiched connector of FIG. 3.
Figure 6:
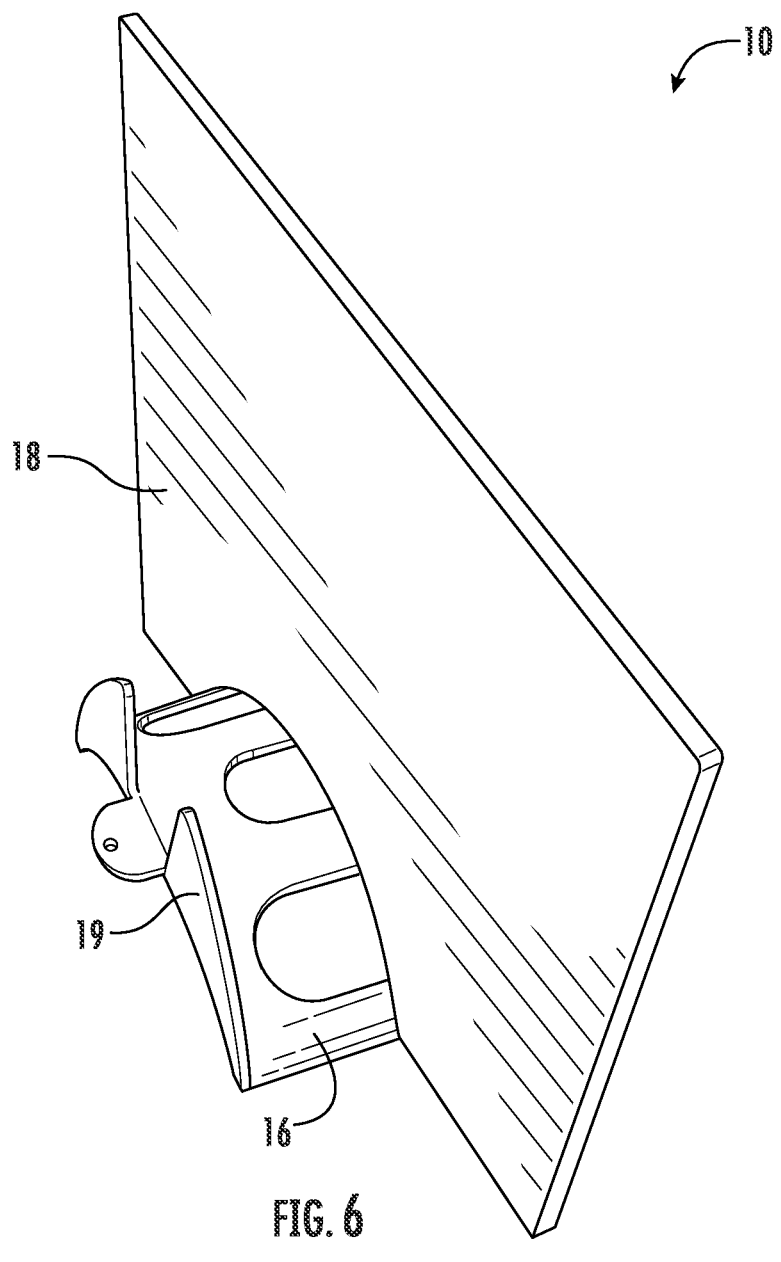
FIG. 6 is a different bottom perspective of the sandwiched connector of FIG. 3.
Figure 7:
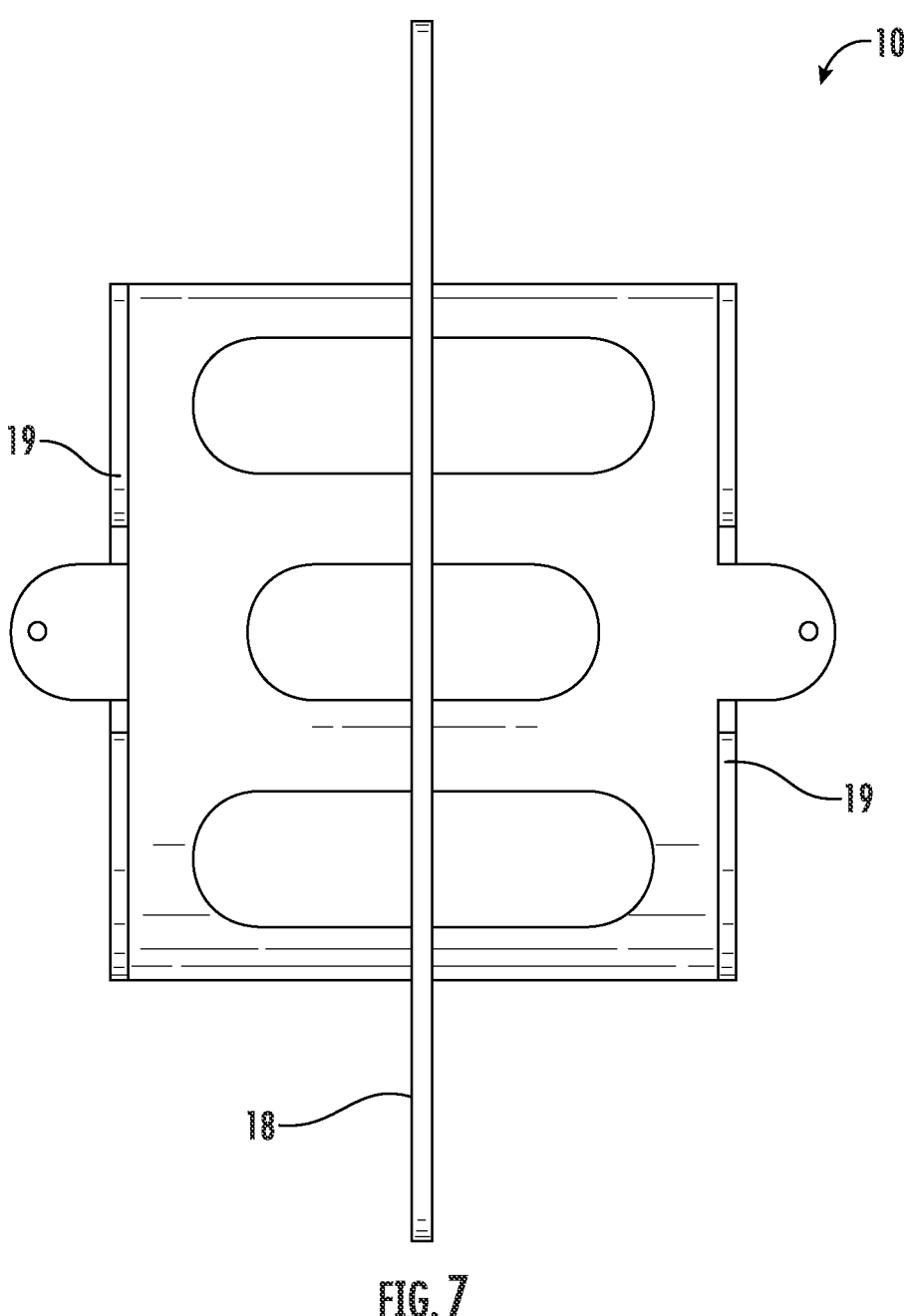
FIG. 7 is a bottom elevation of the sandwiched connector of FIG. 3.
Figure 8:
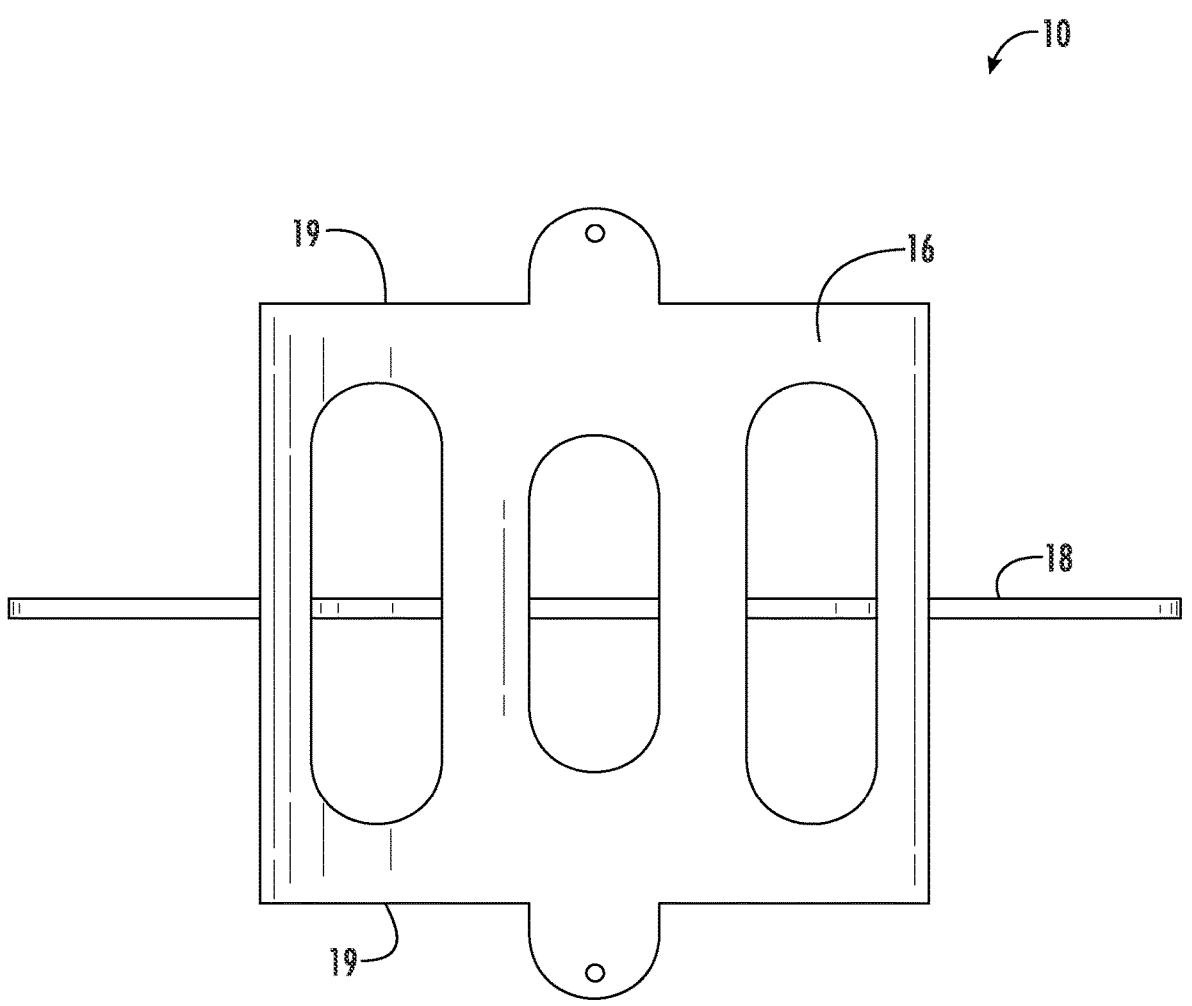
FIG. 8 is a top view of the sandwiched connector of FIG. 3.

With reference to FIGS. 3-8, it is noted that the respective views of the connector are upside down relative to its typical configuration in a drainage unit product, with a pipe positioned in an upper portion of the module and the central fin extending downward (as in FIGS. 1-2C). However, this is not to limit the inventive nature of the embodiments, as the connector may be positioned with the fin extending upward in some drainage units. Altogether, top and bottom identification of the connector is non-limiting to the inventive concepts described and claimed herein.

Figure 9:
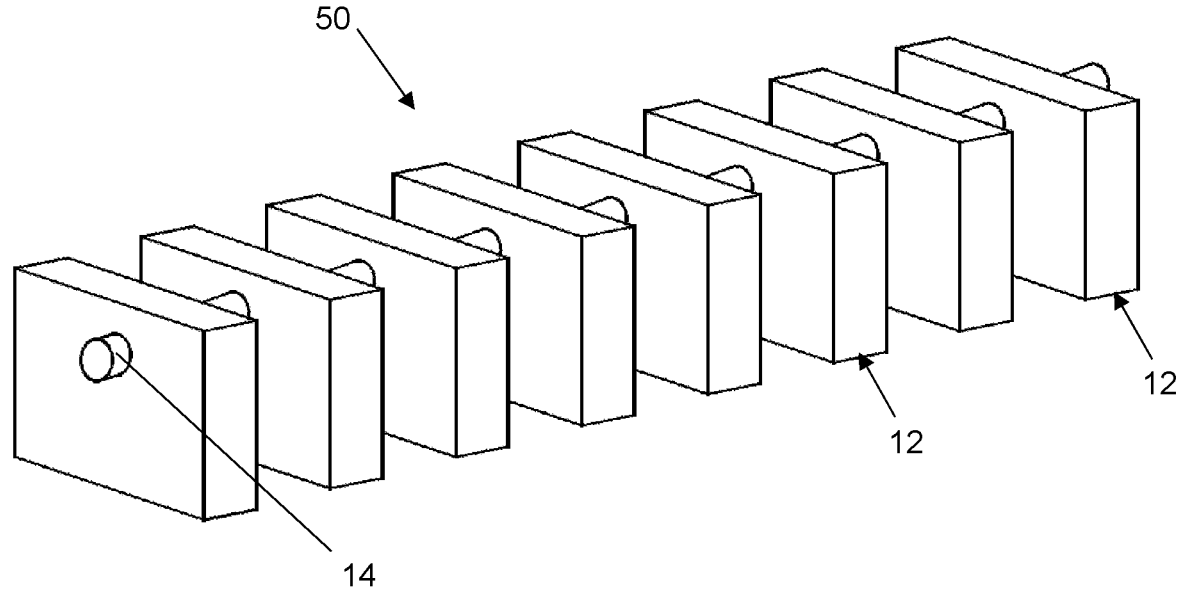
FIG. 9 shows an exemplary fluid treatment system within which the disclosed connector is typically used.

As background to the inventive connectors disclosed herein, the connectors are configured to be used in cooperation with elements in a modular treatment system 50 similar to that shown in FIG. 9. The exemplary treatment system 50 includes a plurality of modules 12 each with a front and rear surface spaced apart along a longitudinally extending pipe 14 that extends through a front and rear face of each module 12. Most generally, each module includes an inner support member wrapped in at least one layer of a fluid permeable treatment fabric 22 with a longitudinal hole extending from the front surface to the rear surface. The pipe 14 includes holes in its cylindrical wall that are aligned with the modules 12 for delivery of wastewater to the interior of the modules between the front and rear faces of fabric (not shown). The fluid is maintained therein and gradually passes through the fabric into the external environment of sand, soil or other backfill that surrounds each module 12. The modules are all generally self-supporting and self-contained, and comprise generally non-absorbent materials as support with a surrounding layer of treatment fabric, that allows fluid flow into the surrounding environment (backfill) through the fabric layer. Within such wastewater systems, the non-absorbent support media is commonly referred to as "distribution media" while the fabric is referred to as "treatment media." The embodiments depicted herein show distribution media formed of several polymeric core sheets with cuspated configuration, however, this is non-limiting. Other embodiments exist, including distribution media formed from one or more of random inert packing, shredded polymeric material and porous walls with hollow interior.

A system 50 is placed within a subsoil excavation and then backfilled with soil, sand, aggregate or similar backfill that fills the space between adjacent modules, essentially enveloping each module. In such systems, the fabric/soil interfacial area is a key factor in the efficacy of a given system. This is because it has been found that a layer with a high concentration of bacteria forms at this interface which is particularly effective at treating wastewater. Thus, it is desirable to maximize surface area of the fabric/soil interface in any way possible. It is also desirable to minimize disruption of the soil environment.

FIGS. 2A and 2B show a preferred embodiment of the internal connector 10. FIG. 2C shows another embodiment of the connector 110 that also includes outer flanges. FIGS. 3-8 show other views of the connector 110 with outer flanges 119 and inner central fin 118; however, as noted, the inventive connector need not include the outer flanges, and in many cases a version like the connector 10 without outer flanges is particularly preferred. In the depicted embodiments, the connector 10 or 110, including the fin 18 or 118, is a single molded unit of polymer material.

As shown in FIGS. 2A and 2B, the connector 10 includes a central partial tubular web 16 extending longitudinally between opposite ends. A central fin 18 extends from the web 16 substantially perpendicular to the axis of the web 16. The central fin 18 is rigidly secured to the pipe 14 in a preferred location along the length of the pipe. The tubular form of the web 16 defines a partial circumferential wall sized and shaped to match somewhat closely to the outer wall of the support pipe 14 in the treatment system 50. The web may include a pair of opposing pre-drilled screw holes (not specifically depicted) to aid in attaching the connector 10 to the pipe 14. Other embodiments omit screw holes and are configured for a user to drive a screw through the solid polymeric material or adhesives may optionally be used to assist creating a connection between the elements.

When secured to the pipe 14, the fin 18 is sandwiched between front and rear sheets of core material 20. Each core sheet 20 has a hole pre-drilled through it sized and shaped for the pipe to extend through. Each module 12 has at least one front core sheet 20 on a front side of the fin 18 and at least one rear core sheet 20 on the rear side of the fin 18 such that the fin is "sandwiched" between the core sheets 20. As shown, the preferred embodiment of FIGS. 2A and 2B includes two front core sheets and two rear core sheets and each core sheet preferably has a cuspated contour. The core sheet 20/connector 10 composite is thereafter wrapped in treatment fabric 22. Typically, the treatment fabric 22 is secured in place around the core sheets 20 via straps wrapped around, but this is a non-limiting mechanism of securing the elements together.

In this manner, each module 12 is fixed in place simply by the fin 18 being sandwiched between core sheets 20 and wrapped in fabric 22—there is no spacing element external to the core sheets or fabric. Additionally, since the fin 18 is positioned entirely between core sheets 20 with no flange, fin or comparable element on the outside of the core sheets, assembly is streamlined compared to existing systems that require careful bending and placement of core sheets around an external fin. Additionally, given the relatively robust size of the internal fin 18 in the connector, no additional straps or fasteners are required to secure the core sheets in place on the connector.

With reference to FIGS. 2C-8, the alternate embodiment of the connector 110 includes opposite annular flanges 119 on opposite longitudinal ends of the web 116, like the connector described in co-owned U.S. Pat. No. 11,254,587. Like the previous embodiment, in this embodiment of the connector 110, the sandwiched fin 118 extends from a substantially longitudinally central position of the web 116.

Each of the connectors 10 and 110 are configured to attach directly to a pipe 14 and take advantage of the sandwiched position of the central fin 18/118 between layers of core sheets 20 wrapped in fabric 22 to hold a respective module 12/112 in place along the pipe without encroaching on the module's fabric/soil surface area. Importantly, the sandwiched fin configuration also prevents the modules from rotating around the axis defined by the pipe. That is, when installed, the connectors lie internal to each module with a fabric layer 22 outside the connector. A further advantage to the preferred embodiment of FIGS. 2A and 2B is that no portion of the connector is positioned longitudinally outside any core sheet, which improves fluid flow out from the module at the fabric surface.

As noted above, assembly of a wastewater treatment system 50 is a straightforward process with the disclosed connector 10 and 110. A series of cuspated core sheets 20 are assembled in a face-to-face configuration on each longitudinal side of a fin 18/118 with the web 16/116 extending through aligned holes in the sheets 20 (i.e., support member). The sheet/connector composite is positioned in a desired longitudinal location along the pipe 14 and then secured in place via screws or similar, followed by wrapping of the core sheet 20 with filter fabric 22 and securing the filter fabric relative to the core sheets, typically via straps around the outside thereof. The wrapping of the filter fabric serendipitously creates an outer filtration surface for the units and secures the module in place both longitudinally and rotationally along the pipe, sandwiching the fin 18/118 of the connector 10/110 secured to the pipe. The sheets 20 are held in place via the central fin 18/118 sandwiched between them. The process is repeated for other modules along the pipe to assemble the wastewater treatment unit.

Alternatively, modules can be attached by first attaching a connector 10/110 to the pipe, followed by sliding core sheets 20 to form a support member and sandwich the central fin 18/118, followed by wrapping the core sheets with fabric as described in the preceding paragraph.

A preferred embodiment of a support member includes a plurality of vertical sheets of a core polymeric material. Other embodiments of a support include a hollow box with perforations in the outer surfaces or other non-absorbent forms of materials.

The connector 110 of FIGS. 2C and 3-8 is fit to the pipe 14 with the web 116 similar to the other embodiment of the connector 10 in FIGS. 2A and 2B, except that one flange 119 is positioned on the outside of the frontmost support member with the other flange 119 on the outside of the rearmost support member. In this manner, each of the opposite flanges 119 longitudinally "sandwich" a series of core sheets 20 with the central fin 118 (which is also sandwiched between core sheets. The fabric layer 22 is wrapped around the outside of the core sheets like the embodiment of FIGS. 2A and 2B.

The connector 10/110 can be secured to the pipe via screws or otherwise mechanically connected by techniques known in the art, such as adhesive, tabs received within a slot, lock and groove, for example.

The connector 10/110 is attached to the pipe 14 angularly positioned with the central fin 18/118 extending downward. This configuration adds structural integrity to the lower portion of the module, which is typically longer than the upper portion, allowing the pipe to be positioned in close proximity to the top edge of the module and improving wastewater storage and treatment capabilities. In a particularly preferred embodiment, the pipe is positioned in an upper section of each module.

A typical installation of a modular treatment system like that depicted generally in FIG. 9 that employs the disclosed internal connectors includes the sequential steps of:

1. Preparing an excavation, usually in a soil environment. The excavation should be sized and shaped to receive a modular unit. Of course, the size and configuration of the modular unit can also be varied as necessary to accommodate an excavation or environment.

2. Modular drainage units 50, including at least a plurality of modules 12 maintained to a support or fluid conduit pipe 14 via internal connectors 10/110 are placed within the excavation. Units can be assembled within the excavation or prior to placement therein. Adjacent support pipe pieces may be connected via appropriate connector and/or adhesive, depending on any regulatory requirements. As indicated above, the plan layout of the modular system can be specified and configured as necessary for the particular environment with use of appropriate connectors.

3. An optional additional fluid permeable fabric overcover may optionally be employed, typically laid over the modular unit to improve subsoil breathability of the system.

4. The excavation is backfilled by hand shoveling or sloughing clean backfill material along the sides, between fabric layers of adjacent spaced modules and the top of the modular treatment units. Backfill material can be clean and porous fill material, such as native soil, pearlite, septic fill, preferably devoid of large rocks. Appropriate seed may be laid over the excavated areas to protect against erosion and improve aesthetics.

As discussed above, all of the embodiments of the drainage unit have a fluid-permeable geotextile fabric wrapping around the front and rear faces, top and bottom faces, and/or side faces of the support module. The connectors are concealed within the modules such that they do not encroach into the surrounding soil environment and do not cover any of the fabric layer. In the embodiment of FIGS. 2A and 2B, no part of the connector is external to the core support, thus enhancing fluid flow even further. The internal spacers thus help maximize the area of the fabric/soil interface—and resulting biomat layer—of each module to improve fluid treatment efficiency and quality. The bottoms may be wrapped or may be left uncovered to contact the excavation floor and facilitate fluid transfer to the soil. The fabric can be sewn into a formed cover and fitted over the support module. The cover, or separate fabric sections, can also be fastened to the support module by any other suitable method, for example by adhesive bonding, heat welding, stapling or banding. In these embodiments, the disclosed internal spacer is covered by the fabric layer (i.e., the flanges are sandwiched between the fabric and the underlying face of the support). The relatively large central fin of the connector in each of the embodiments of the connector 10/110 provides each module with substantially improved stability relative to other types of connectors known in the art.

While preferred embodiments of the foregoing invention have been set forth for purposes of illustration, the foregoing description should not be deemed a limitation of the invention herein. Accordingly, various modifications, adaptations and alternatives may occur to one skilled in the art without departing from the spirit and scope of the present invention.

The invention claimed is:

1. A fluid treatment unit, comprising:
an elongate support pipe defining a longitudinal axis;
one or more fluid treatment modules positioned on the pipe with the pipe extending longitudinally through a front and rear face thereof;
a connector attached to the support pipe with a fin extending substantially perpendicular to the longitudinal axis, the connector holding one of the one or more fluid treatment modules in its longitudinal position on the pipe, wherein
the one or more fluid treatment modules comprises a front support portion on a first longitudinal side of the fin and a rear support portion on a second longitudinal side of the fin, and
a layer of filtration media is wrapped around the front support portion and rear support portion of the one or more fluid treatment modules, thereby fixing the module in place with the fin sandwiched between the front support portion and rear support portion.

2. The fluid treatment unit of claim 1, wherein each of the front support portion and rear support portion is formed from one or more upright polymer sheets.

3. The fluid treatment unit of claim 2, wherein the upright polymer sheets have a cuspated contour.

4. The fluid treatment unit of claim 2, wherein each of the front support portion and rear support portion includes a plurality of upright polymer sheets.

5. The fluid treatment unit of claim 1, wherein the filter media is a fluid permeable fabric.

6. The fluid treatment unit of claim 1, wherein the support pipe has an outer wall with one or more holes aligned with the module.

7. The fluid treatment unit of claim 1, comprising at least two of the one or more fluid treatment modules, wherein each of the fluid treatment modules is held in its longitudinal position by one of the connectors with spacing between adjacent modules.

8. The fluid treatment unit of claim 1, wherein the support pipe is fluidly connected to a fluid source and configured to deliver fluid from the source to the one or more fluid treatment modules.

9. The fluid treatment unit of claim 1, wherein
the connector comprises a web extending longitudinally from a front end to a rear end,
the web has an arced inner contour configured to engage with an outer wall of the pipe, and
the fin extends from the web substantially perpendicularly to the longitudinal axis.

10. The fluid treatment unit of claim 1, wherein the fin is substantially planar.

11. A fluid treatment unit, comprising:
an elongate support pipe defining a longitudinal axis;
a plurality of fluid treatment modules positioned on the pipe with the pipe extending longitudinally through a front and rear face thereof and longitudinal spacing between adjacent modules, each of the plurality of fluid treatment modules having a support unit with at least the front face and rear face being wrapped in fabric; and
a plurality of connectors attached to the support pipe, each having a fin extending substantially perpendicular to the longitudinal axis and into an interior of the support unit of one of the plurality of fluid treatment modules to maintain the respective module in its longitudinal position on the pipe.

12. The fluid treatment unit of claim 11, wherein each of the plurality of fluid treatment modules has fabric wrapped entirely around its outside.

13. The fluid treatment unit of claim 11, wherein the fin of each connector is sandwiched between a front core support sheet and a rear core support sheet.

14. The fluid treatment unit of claim 13, wherein each of the core support sheets has an undulated contour.

15. The fluid treatment unit of claim 11, wherein each of the modules has a height between a top and a bottom and the pipe extends through the front and rear faces of each module at a position closer to the top than the bottom of the respective module.

16. The fluid treatment unit of claim 15, wherein the fin extends from the pipe in a direction toward the bottom of the respective module.

17. The fluid treatment unit of claim 11, wherein each of the modules has a height between a top and a bottom and the fin extends from the pipe in a direction toward the bottom of the respective module.

18. The fluid treatment unit of claim 11, wherein each of the fins is substantially planar.

19. The fluid treatment unit of claim 11, wherein each of the connectors includes a front flange sandwiched between a front of the support and the fabric and a rear flange sandwiched between a rear of the support and the fabric.

20. A connection within a fluid treatment unit, comprising:

a connector comprising a substantially flat fin defining a front side and rear side;

one or more front units of support that is non-fluid absorbent abutting the front side of the fin;

one or more rear units of support that is non-fluid absorbent abutting the rear side of the fin;

one or more layers of fabric that is fluid permeable wrapped around the one or more front units and one or more rear units, thereby holding the one or more front units and one or more rear units relative to each other and the connector with the fin maintained between the one or more front units and one or more rear units via force from the wrapping, wherein the connector is rigidly attachable to a fluid distribution conduit to thereby yield a rigid engagement of the one or more front units, one or more rear units and one or more layers of fabric relative to the fluid distribution conduit.

\* \* \* \* \*